United States Patent Office 3,108,984
Patented Oct. 29, 1963

3,108,984
PROCESS FOR INCORPORATING ADDITIVES INTO POLYMERIC PRODUCTS
Floyd E. Romesberg, Midland, and Robert M. Karlinski, Saginaw, Mich., assignors to The Dow Chemical Company, Midland, Mich., a corporation of Delaware
No Drawing. Filed Apr. 20, 1959, Ser. No. 807,310
4 Claims. (Cl. 260—34.2)

This invention relates to a process for preparing polymeric products having incorporated therein certain additives. More particularly it relates to such a process for incorporating such additives into products prepared by electrolyte coagulation of polymer latexes.

This application is a continuation-in-part of U.S. Serial No. 612,893, filed September 28, 1956, and now abandoned.

Polymer latexes are particularly useful forms from which to prepare continuous articles such as films, foils, and tapes. In preparing such articles the latex may be cast into the approximate shape desired on a supporting surface by using a transfer roll, doctor blade, air knife or the like. The cast wet film is then dried and fused either simultaneously or sequentially. An alternative procedure is to cast and coagulate the polymer latex continuously in the approximate shape after which the porous film is dried and fused. Thus, the number of procedural steps needed to convert a latex into a continuous coherent article by either procedure is kept at a minimum and the steps are simple in operation, the capital investment in film forming equipment is low, the equipment is easy to clean and maintain and is versatile in being useful for many different latexes without major modification. However, most polymers require certain additives to achieve commercial status. Among those additives may be mentioned light and heat stabilizers and plasticizers. In the past it was necessary to incorporate those additives into the latex either prior to or following polymerization. When added prior to polymerization the additives frequently altered the polymerization kinetics and also changed the particle size. In addition a latex so prepared was limited to applications where that particular additive was desired. When added following polymerization the incorporation required that the latex be subjected to extra mechanical shearing forces and frequently because of such forces or by the chemical nature of the additives either prematurely coagulated the latex or changed its film forming characteristics.

In view of the above difficulties in incorporating necessary additives into polymer latexes it is the principal object of this invention to provide a novel process for incorporating such additives into a polymeric product prepared from polymer latexes.

It is a further object to provide such a process wherein the additives are added after the latex has been formed into the approximate shape desired.

It is a still further object to provide such a process for incorporating a wide variety of additives into such a formulation.

The above and related objects are accomplished by means of a process wherein a film forming, electrolyte-coagulable latex of a polymeric composition, as will be defined, is formed by the localized electrolyte coagulation into the approximately desired shape as a continuous, coherent, porous, coagulum, the coagulum washed to remove substantially all of the electrolyte coagulant, excess water removed without destroying the porosity of the coagulum, and the coagulum then immersed in a solution of the desired additive in a non-solvent for the polymer after which it is dried and fused. Polymeric articles prepared in this manner have the additive uniformly distributed throughout.

By localized electrolyte coagulation is meant the controlled coagulation of the latex at the site at which the coagulum is to be formed and shaped as contrasted to the coagulation of a large volume of latex with subsequent shaping.

The polymer latexes useful in this invention are those which are electrolyte coagulable into a continuous microporous coherent coagulum. It is not essential that the continuous, coherent, coagulum resulting from the electrolyte coagulation be self-supporting, impermeable, transparent, or commercially useful by air drying, but it is necessary that the coagulum has sufficient cohesiveness that it be a unitary integral article. It is known that some latexes require minor treatment to aid their inherent film forming characteristics, their casting ability, or their coagulability. For example it is fequently advantageous to add a very small amount of a hydrophilic, colloidal thickener, such as water soluble cellulose ethers, and to adjust the pH of the latex. Such techniques which enhance the film formability of the latex are intended to be within the scope of the invention.

Any non-elastic thermoplastic polymeric material which in latex form is film forming and electrolyte coagulable may be employed in the process of this invention. As materials which may be advantageously used are the normally crystalline polymeric materials. These are the polymers which have a tendency to form crystallites or sites where small segments of a plurality of the polymer chains are oriented and held in position by secondary valence forces. This crystallite formation or crystallinity is usually visible when the polymers are examined by X-ray diffraction. It is the normally crystalline polymers which are orientable to an end point and consequently are of most utility in the manufacture of filamentary articles. By orientable to an end point is meant that the stress-strain curves of the polymers exhibit a point where there is considerable resistance to further elongation with increased load. This orientation to an end point is of critical importance wherever a longitudinal stress will be applied to the article, such as those found in weaving. Typical of the normally crystalline polymeric materials falling within the advantageous definition are the polymers and copolymers of at least 70 percent by weight of vinylidene chloride with the remainder composed of one or more other monoethylenically unsaturated comonomers exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Known ternary compositions also may be employed advantageously. Representative of such polymers are those composed of at least 70 percent by weight of vinylidene chloride with the remainder made of for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride butadiene and vinyl acetate, vinyl propionate, or vinyl chloride and vinyl ethers and vinyl chloride. Quaternary polymers of similar monomeric composition will also be known. It has been found that the normally crystalline copolymers composed of from about 92 to 99 percent by weight of vinylidene chloride and correspondingly from 8 to 1 percent by weight of acrylonitrile have suitable polymerization characteristics, are well adapted for use in the manipulative steps in this process, and result in exceptionally useful filamentary articles. For these reasons these vinylidene chloride-acrylonitrile copolymers represent a preferred species for use herein. It should be understood, however, that the process is not limited to the treatment of normally crystalline polymers but that any non-elastic polymeric material which has film-forming characteristics in latex form may be employed. There are many materials such as polyvinyl chloride and polystyrene which are capable of forming continuous coherent articles from the form of a latex, which are orientable but do not normally form crystallites. The elastic polymers, such as natural or synthetic rubbers are so soft that from latex form they will not form a coagulum that will retain a microporous structure. Consequently such elastic polymers will not be of use in the present invention.

The latexes may be prepared by any of the known procedures for polymerization in aqueous emulsion. Typically the monomer or monomers are dispersed in an aqueous solution of from about 0.05 to 5 percent polymerization catalyst, such as potassium persulfate or hydrogen peroxide, and from about 0.05 to 5 percent of a surface active agent capable of emulsifying the monomers. Many such surface active agents are known. Polymerization is initiated by heating the emulsified mixture usually between 35° C. and 100° C. and continued by maintaining the polymerizing emulsion at the selected temperature. After the polymerization has reached the desired conversion of monomer to polymer, the latex is filtered to remove any precoagulum and stabilized to storage if necessary by the addition of a small amount of a surface active agent.

Latexes which are to be used in forming continuous coherent articles such as films, should preferably contain from about 30 to about 50 percent by weight of non-volatile solids. When less than about 30 percent by weight of non-volatile solids are present in the latex, no useful, continuous, coherent articles can be produced by simple deposition of the latex. Latexes having appreciably more than 50 percent by weight of non-volatile solids are difficult to prepare and are extremely sensitive to mechanical shear and to storage and may coagulate prematurely.

It is also known that the quality of continuous, coherent articles prepared by the deposition of a latex is dependent upon the latex particle size. The particle size is a function of the kind and concentration of emulsifier, the temperature of polymerization, and rate of agitation used in forming the initial dispersion. Most latexes will generally not form films by simple deposition unless substantially all of the particles are under 2000 Angstrom units in diameter. The most desirable results are obtained when the majority of the dispersed polymer particles have diameters between 400 and 1200 Angstrom units. Means for making latexes whose particles are these dimensions are known.

Procedures for the deposition of latexes on a supporting surface are known. Typically the latex is metered as by a transfer roll, or doctored onto a surface wetted with coagulant to provide a wet coagulum of uniform thickness. A convenient device for removing excess water to produce the solid, porous coagulum required in this invention is a planiform air blast, sometimes called an air knife, which may be directed tangentially or at a slight angle to the surface of the wet film.

The process of the invention is not dependent upon the function served by any particular additive in the polymer formulation. Thus by the term "additive" it is meant to include any material which is desired to be incorporated into the polymer formulation. Usually such materials are incorporated or blended with the polymer to serve a specific function. For example pigments and dyes serve in a decorative capacity. Light stabilizers and heat stabilizers serve in a protective capacity. Plasticizers serve to alter the rheology of the polymer formulation. Thus these additives may be either organic or inorganic materials. For example light stabilizers are usually organic compounds such as phenyl salicylate, dibenzoyl resorcinol and 5-chloro-2-hydroxy benzophenone. Plasticizers likewise are commonly organic compounds and include, typically, esters such as tributyl aconitate, dioctyl phthalate, and the like. Heat stabilizers frequently are inorganic materials. Illustrative of these are sodium tripolyphosphate and tetrasodium pyrophosphate. Thus for use in the process it is only necessary that the additive be capable of dissolution in a non-solvent for the polymeric material. Solvents for any of the additives will be known by reference to standard reference works or may be easily determined by simple preliminary solubility experiments. By means of the process it is possible to incorporate materials which serve no active function in the formulation but are incorporated for economic or practical considerations.

As mentioned any of the common additives which are incorporated into polymer formulations may be added in this process. It is only necessary that the additive be soluble in a non-solvent for the polymer at a concentration at which the requisite amount of additive may be absorbed by the porous film. The maximum amount of absorption of additive solution is determined by the porosity of the porous film. Thus, the concentration of additive that will be deposited in the coagulum will be determined by the concentration of the additive in the solution and by the porosity of the coagulum. The concentrations of the various common additives required with particular polymers are known or may be determined by simple preliminary experiments. Thus with the preferred normally crystalline vinylidene chloride polymers the common inorganic heat stabilizers and the organic light stabilizers are employed in an amount of from about 0.1 to 10 percent by weight based on the weight of the polymer. Plasticizers are usually used in an amount of from about 2 to 15 percent by weight based on the weight of the polymer.

The porosity of the coagulum depends upon the particular polymer employed, the nature and concentration of coagulant, and the temperature of coagulation. When a normally crystalline vinylidene chloride polymer latex is coagulated with the minimum amount of coagulant at room temperature, the void space of the coagulum or the porosity is about 60 percent of the volume of the coagulum.

Electrolyte coagulants that are useful in the continuous localized coagulation of polymer latexes are well known in the latex art. Typically such coagulants are water soluble inorganic salts of metallic cations. Although those salts of monovalent metallic ions, such as sodium chloride and the like, are operable it is preferred to use those water soluble salts of metallic cations having valence greater than 1 because of their much stronger coagulating efficiency. Among the preferred materials are magnesium and calcium chlorides and aluminum sulfate. Other electrolyte coagulants will be known to the skilled worker. The coagulant is usually employed in a concentration of from about 0.5 to 20 percent by weight although the minimum concentration required to coagulate the latex is to be preferred. Using more than the minimum necessitates excessive washing of the coagulum to remove the coagulant.

In operation the polymer latex is coagulated into a continuous coherent coagulum by continuously casting a polymer latex on a roll or other continuous surface which has been wetted with an electrolyte coagulant. The coagulum is water washed to remove substantially all of the coagulant and the excess water is removed by air drying, draining, or by the use of a device such as an air knife. The wet porous coagulum is passed through a solution of the desired additive in a non-solvent for the polymer after which the additive-solvent (polymer non-solvent) is removed by drying. Finally the porous coagulum is fused to produce a continuous coherent fused article. When crystalline polymers are used in the process, a further step in the preparation of the most useful films is orientation.

It is only necessary that the continuous, coherent coagulum be in contact with the additive solution long enough for the solution to diffuse uniformly throughout the coagulum. That contact time will vary depending upon the porosity and thickness of the coagulum and on the surface tension or diffusibility of the additive solvent as well as its miscibility with the water remaining in the coagulum after the excess is removed. It has been found that when treating films, tapes, filaments, and other similar articles which have at least one very small dimension, the contact time need be of but a few seconds' duration. Because the process is capable of continuous operation it may be combined with other processing steps such as orientation, slitting, and marking and stamping.

In a modified embodiment of the process the coagulum is first passed through a solution of one additive after which it is immediately passed through a second bath of a compound capable of reacting with the additive to produce an insoluble additament or for other reasons.

The operation of the process will be more apparent from the following illustrative examples wherein all parts and percentages unless otherwise specified are by weight.

*Example 1*

A latex was prepared by the emulsion polymerization of comonomers composed of 97 percent vinylidene chloride and 3 percent acrylonitrile. The latex was filtered to remove precoagulum and the latex found to contain about 40 percent non-volatile solids. A continuous belt was wetted with a 20 percent aqueous calcium chloride solution and subsequently brought into contact with the latex. A continuous coherent coagulum of 60 percent porosity formed immediately. The coagulum was water washed. Excess water was removed from the coagulum by means of an air knife. The coagulum was immersed in a 0.326 percent aqueous solution of sodium tetraphosphate for 5 seconds. The coagulum was removed from the solution, dried and fused to a high density amorphous film. That film was then oriented and tested for heat stability at 125° C. for ½ hour. The change in color after exposure was found to be 2.4 as measured with a Hunter color and color difference meter.

A coagulum of the same latex was prepared as above for comparison. In this instance, however, the film was not immersed in the tetraphosphate bath but was dried, fused and oriented immediately after water washing the coagulant from the coagulum. After exposure for ½ hour at 125° C. the color change was found to be 8.3 as measured above.

*Example 2*

A sample of a continuous, coherent coagulum was prepared as in Example 1. The coagulum was passed through a 2 percent aqueous solution of sodium tripolyphosphate and then through a 5 percent aqueous solution of calcium chloride which caused precipitation of calcium tripolyphosphate within the coagulum. The coagulum was dried, fused, and oriented to produce a film. This film was able to resist repeated laundering with aqueous detergent without loss of heat stability.

*Example 3*

A sample of a coagulum was prepared in the manner of Example 1. Following removal of excess water after water washing, the coagulum was allowed to air dry. The dried coagulum was then passed through a 2 percent acetone solution of dibenzoyl resorcinol, a light stabilizer for the polymer. The coagulum was dried, fused, and oriented. The light stability of the film was determined by exposure to ultraviolet sun lamps until a standard degree of discoloration was attained. It was found that this film reached that discoloration in 80 hours.

By way of contrast, a similar coagulum was prepared but was not dipped into a light stabilizer bath. After drying, fusing, orienting and testing as above, the discoloration was reached in about 24 hours.

*Example 4*

Continuous, coherent coagula were prepared as in Example 3. One of the air dried coagula was passed through a 5 percent acetone solution of tributyl aconitate. After drying, fusing and orienting the resultant film was checked for the presence of plasticizer by manually flexing the film and checking the physical properties. The film was soft and flexible.

A similar film prepared as above but without the immersion in plasticizer was brittle and hard.

What is claimed is:

1. A process for incorporating additives into polymeric products comprising as essential steps (1) forming a continuous self-supporting coherent porous coagulum on a supporting surface by wetting said supporting surface with an aqueous solution of an inorganic salt of a metallic cation as a coagulant and bringing the so-wetted surface continuously into contact with a latex containing at least about 30 percent by weight of the polymeric solids of a normally crystalline vinylidene chloride copolymer containing at least 70 percent by weight of vinylidene chloride with the remainder composed of at least one copolymerizable monoethylenically unsaturated comonomer copolymerized with said vinylidene chloride; (2) washing said continuous coherent porous coagulum with water to remove substantially all of the electrolyte coagulant; (3) draining and volatilizing excess water from the washed coagulum without destroying the porous structure; (4) immersing said coagulum in a solution of the additive in a non-solvent for the polymer of said latex until said solution has diffused through said coagulum; (5) drying said coagulum at a temperature below the decomposition temperature of the polymer to remove substantially all of the additive solvent; and (6) subjecting said dry coagulum to elevated temperature to fuse said coagulum into a continuous coherent integral polymeric article.

2. The process claimed in claim 1, wherein said copolymer is composed of from about 92 to 99 percent by weight of vinylidene chloride and correspondingly from 8–1 percent by weight of acrylonitrile.

3. The process claimed in claim 1, wherein said continuous coherent, porous coagulum of step (1) is formed by casting a metered amount sufficient to form a continuous wet film of said latex onto a solid surface wetted with a 0.5 to 20 percent by weight aqueous solution of electrolyte coagulant.

4. The process claimed in claim 3, wherein said electrolyte coagulant is calcium chloride.

References Cited in the file of this patent

UNITED STATES PATENTS

| | | |
|---|---|---|
| 2,215,562 | Ogilby | Sept. 24, 1940 |
| 2,251,486 | Hanson | Aug. 5, 1941 |
| 2,268,678 | Tingey | Jan. 6, 1942 |
| 2,311,488 | Thomas | Feb. 16, 1943 |
| 2,340,243 | Beal | Jan. 25, 1944 |
| 2,404,723 | Merner | July 23, 1946 |
| 2,524,811 | Koberlein | Oct. 10, 1950 |
| 2,686,738 | Teeters | Aug. 17, 1954 |
| 2,725,370 | Caldwell | Nov. 29, 1955 |
| 2,744,085 | Hubbard | May 1, 1956 |
| 2,837,437 | Finlayson et al. | June 3, 1958 |